US007762757B2

(12) United States Patent
Ueda et al.

(10) Patent No.: US 7,762,757 B2
(45) Date of Patent: Jul. 27, 2010

(54) WORKPIECE TRANSFER SYSTEM AND WORKPIECE TRANSFER METHOD

(75) Inventors: Minoru Ueda, Tokyo (JP); Masami Mitsuhashi, Tokyo (JP); Nobuo Mashino, Tokyo (JP); Eisaku Andou, Tokyo (JP); Yasushi Tokoyo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 11/666,809

(22) PCT Filed: Dec. 14, 2005

(86) PCT No.: PCT/JP2005/022924

§ 371 (c)(1),
(2), (4) Date: May 1, 2007

(87) PCT Pub. No.: WO2006/064827

PCT Pub. Date: Jun. 22, 2006

(65) Prior Publication Data

US 2007/0267878 A1  Nov. 22, 2007

(30) Foreign Application Priority Data

Dec. 16, 2004 (JP) ............................ 2004-364359

(51) Int. Cl.
*B66C 23/00* (2006.01)

(52) U.S. Cl. ..................................... 414/590; 212/901

(58) Field of Classification Search ................. 414/427, 414/428, 590, 589; 212/901
See application file for complete search history.

(56) References Cited

U.S. PATENT DOCUMENTS 3,491,427 A * 1/1970 Zimmerman et al. .......... 29/240
4,676,713 A * 6/1987 Voelpel ....................... 414/590

FOREIGN PATENT DOCUMENTS

JP  07-001276  1/1995
JP  07-276284  10/1995

* cited by examiner

*Primary Examiner*—Donald Underwood
(74) *Attorney, Agent, or Firm*—Carrier, Blackman & Associates PC.; Joseph P. Carrier; William D. Blackman

(57) ABSTRACT

A workpiece transfer system includes a bracket rotatably supported on a support part, a rotary drive mechanism provided on the support part in order to rotate the bracket, a workpiece support arm swingably and axially supported on the bracket, a swing drive mechanism provided on the bracket in order to swing the workpiece support arm, and a workpiece retainer provided on a tip end part of the workpiece support arm and retaining a workpiece that is to be transferred, the workpiece being inclined by operation of the swing drive mechanism when the rotary drive mechanism is operated so that a center of gravity of the workpiece comes on the vicinity of an axis of rotation of the rotary drive mechanism. This reduces the rotational load on the rotary drive mechanism, and since a small size and a reduction in weight can be achieved for the system, the workpiece transfer system and method enables a single worker to easily give a workpiece an inclination and inversion attitude change.

16 Claims, 11 Drawing Sheets

WORKPIECE TRANSFER SYSTEM AND WORKPIECE TRANSFER METHOD

CROSS-REFERENCE TO RELATED APPLICATIONS

The present application is a U.S. National phase of, and claims priority based on PCT/JP2005/022924 filed 14 Dec. 2005, which, in turn, claims priority from Japanese patent application 2004-364359, filed 16 Dec. 2004. The entire disclosure of each of the referenced priority documents is incorporated herein by reference.

TECHNICAL FIELD

The present invention relates to a workpiece transfer system and a workpiece transfer method that, when transferring a workpiece to a predetermined location, can give the workpiece an inclination and inversion attitude change.

BACKGROUND ART

For example, in an assembly line for a motor vehicle, when a spare wheel is taken out of a spare wheel supply section and transferred to a spare wheel retaining dish in a lower rear part of the motor vehicle, it is necessary to give the spare wheel various attitudes such as inclining it and inverting it, and all such operations have conventionally been carried out manually. In this case, since the spare wheel is a heavy object, the transfer operation involves heavy physical labor.

DISCLOSURE OF INVENTION

Problems to be Solved by the Invention

The present invention has been accomplished in the light of the above-mentioned circumstances, and it is an object thereof to provide a workpiece transfer system and a workpiece transfer method that enable a single worker to easily give a workpiece an inclination and inversion attitude change.

Means for Solving the Problems

In order to attain the above object, according to a first aspect of the present invention, there is provided a workpiece transfer system comprising a bracket rotatably supported on a support part, rotary drive means provided on the support part in order to rotate the bracket, a workpiece support arm vertically, swingably and axially supported on the bracket, swing drive means provided on the bracket in order to swing the workpiece support arm, workpiece retaining means provided on a tip end part of the workpiece support arm and retaining a workpiece that is to be transferred, and restricting means for restricting an angle of the workpiece support arm, which is swung vertically by operation of the swing drive means, so as to be a predetermined fixed angle so that a center of gravity of the workpiece retained by the workpiece retaining means comes on an axis of rotation of the rotary drive means or the vicinity thereof, operation of the rotary drive means enabling the bracket to be rotated while the workpiece support arm is at a predetermined swing angle position by the restricting means.

According to a second aspect of the present invention, in addition to the first aspect, the support part is formed from a support post, a horizontally extending first arm supported on the support post so as to be capable of rising and falling and capable of rotating around an axis of the support post, and a horizontally extending second arm pivotably connected to a tip end part of the first arm.

According to a third aspect of the present invention, in addition to the second aspect, the workpiece transfer system comprises a first brake for preventing rotation of the first arm around the axis of the support post, a second brake for preventing relative pivoting of the first and second arms, and a third brake for preventing rotation of the bracket.

According to a fourth aspect of the present invention, in addition to the third aspect, the third brake is incorporated into the rotary drive means.

According to a fifth aspect of the present invention, in addition to any one of the second to fourth aspects, the workpiece transfer system comprises guide means for horizontally movably supporting the support post.

According to a sixth aspect of the present invention, in addition to any one of the first to fifth aspects, the workpiece transfer system comprises restricting means for restricting to a fixed angle the swing of the workpiece support arm due to operation of the swing drive means.

The workpiece support arm corresponds to a third arm 33 in an embodiment of the present invention, which will be described later, the raise/lower drive means corresponds to a first air cylinder 20, the rotary drive means corresponds to an electric motor 30, the swing drive means corresponds to a second air cylinder 35, the workpiece retaining means corresponds to a clamp 40, the guide means corresponds to a guide rail 11, and the restricting means corresponds to a stopper 36.

According to a seventh aspect of the present invention, there is provided a workpiece transfer method comprising a first step of retaining, by a tip end part of a workpiece support arm axially supported on a bracket supported on a support part rotatably around a horizontal axis, a workpiece that is to be transferred, while swinging the bracket vertically, a second step of inverting the workpiece by rotating the workpiece support arm around the horizontal axis after the first step, and a third step of moving the bracket to thus move the workpiece to a predetermined transfer position and releasing retention of the workpiece after the second step, the workpiece support arm being vertically swung up to a predetermined fixed angle so that the center of gravity of the workpiece comes on the horizontal axis or the vicinity thereof prior to the workpiece being inverted by rotation of the workpiece support arm around the horizontal axis in the second step, and in the third step the workpiece at a predetermined angle after being swung being rotated around the horizontal axis by rotation of the bracket.

According to an eighth aspect of the present invention, in addition to the seventh aspect, in the second step rotation of the workpiece support arm around the horizontal axis is carried out manually.

According to a ninth aspect of the present invention, in addition to the seventh aspect, in the second step rotation of the workpiece support arm around the horizontal axis is carried out by operation of an actuator.

Effects of the Invention

In accordance with the first aspect of the present invention, since the workpiece can be inclined by operation of the swing drive means and inverted by operation of the rotary drive means, a single worker can easily give the workpiece an inclination and inversion attitude change. Moreover, when the rotary drive means is operated, since the workpiece is inclined in advance by operation of the swing drive means to a predetermined angle restricted by the restricting means to thus make it possible to position the center of gravity of the workpiece on the axis of rotation of the rotary drive means or the vicinity thereof, the rotational load on the rotary drive means can be reduced; it is thereby sufficient for the rotary drive means to be of a small type with a relatively small output, and a reduction in weight and a low production cost can be achieved for the system.

Furthermore, in accordance with the second aspect of the present invention, by carrying out raising/lowering of the first arm, rotation of the first arm around the axis of the support post, relative pivoting of the first and second arms, rotation of the bracket, and swinging of the workpiece support arm, the workpiece retained by the workpiece retaining means can with little effort be given a change of position, such as raising/lowering, horizontal movement, inclination, or inversion, and it is therefore possible for a single worker to easily transfer the workpiece to a desired location even in a confined place, thereby greatly reducing the load on the worker.

Moreover, in accordance with the third aspect of the present invention, operation of the first brake can restrict rotation of the first arm around the axis of the support post, operation of the second brake can restrict relative pivoting of the first and second arms, operation of the third brake can restrict rotation of the bracket, and transfer of the workpiece can be carried out more easily and appropriately while stabilizing the attitude thereof.

Furthermore, in accordance with the fourth aspect of the present invention, rotation of the bracket can be restricted at the same time as operation of the rotary drive means stops, the attitude of the workpiece in an inverted state can be stabilized, and the transfer operation can be carried out more easily and appropriately.

Moreover, in accordance with the fifth aspect of the present invention, even when an object to which the workpiece is to be transferred is moving, aligning the direction of horizontal movement of the support post with the direction of movement of the object enables the workpiece to be easily transferred to the object.

Furthermore, in accordance with the sixth aspect of the present invention, when the swing drive means operates, the swing of the workpiece support arm can automatically be restricted to a fixed angle by the restricting means, and it is therefore possible to always appropriately position the center of gravity of the workpiece in the vicinity of the axis of rotation of the rotary drive means, thereby reliably reducing the rotational load on the rotary drive means.

Moreover, in accordance with the seventh aspect of the present invention, a single worker can easily give the workpiece an inclination and inversion attitude change. Furthermore, when inverting the workpiece, vertically swinging the workpiece support arm to a predetermined angle in advance enables the center of gravity of the workpiece to be set on the horizontal axis or the vicinity thereof and enables the workpiece to be inverted with little effort.

Furthermore, in accordance with the eighth aspect of the present invention, when inverting the workpiece, since vertically swinging the workpiece support arm in advance to a predetermined angle the center of gravity of the workpiece to be set on the horizontal axis or the vicinity thereof, then it is possible to invert the workpiece manually with little effort.

Moreover, in accordance with the ninth aspect of the present invention, when inverting the workpiece, since vertically swinging the workpiece support arm in advance to a predetermined angle enables the center of gravity of the workpiece to be set on the horizontal axis or the vicinity thereof, then it is possible to invert the workpiece with a relatively small capacity actuator.

EXPLANATION OF REFERENCE NUMERALS AND SYMBOLS

W Workpiece (Spare Wheel)
11 Guide Rail
13 Support Post
15 First Brake
20 Raise/lower Drive Means (First Air Cylinder)
22 First Arm
24 Second Arm
25 Second Brake
30 Rotational Drive Means (Electric Motor)
30a Output Shaft
31 Bracket
33 Third Arm
34 Third Brake
35 Swing Drive Means (Second Air Cylinder)
40 Workpiece Retaining Means (Clamp)

BEST MODE FOR CARRYING OUT THE INVENTION

A mode for carrying out the present invention is explained by reference to a erred embodiment of the present invention shown in the attached drawings.

Embodiment 1

Figure 1:
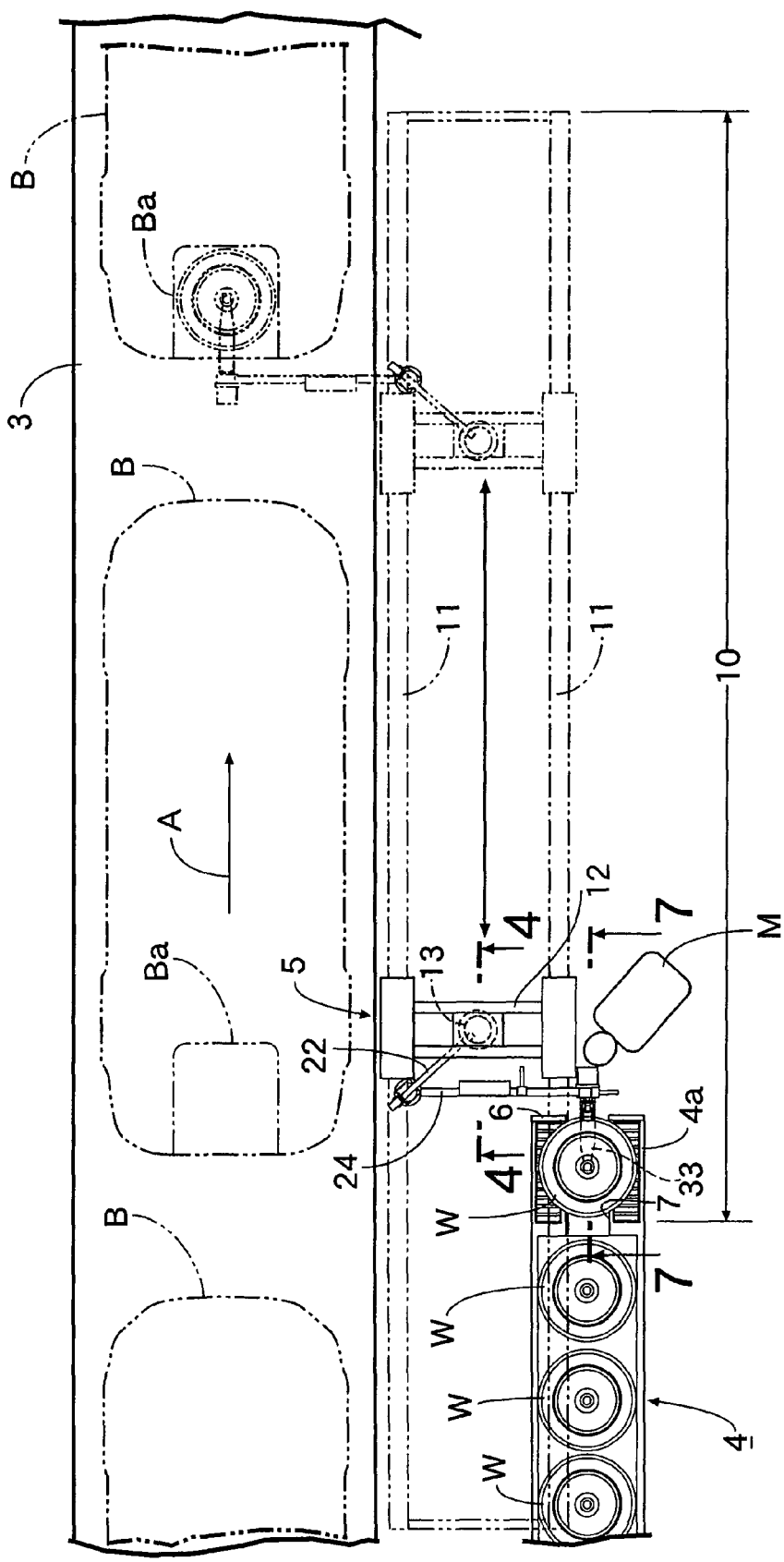
FIG. 1 is a plan view of an essential part of a motor vehicle assembly line equipped with the workpiece transfer system related to the present invention (first embodiment).
Figure 2:
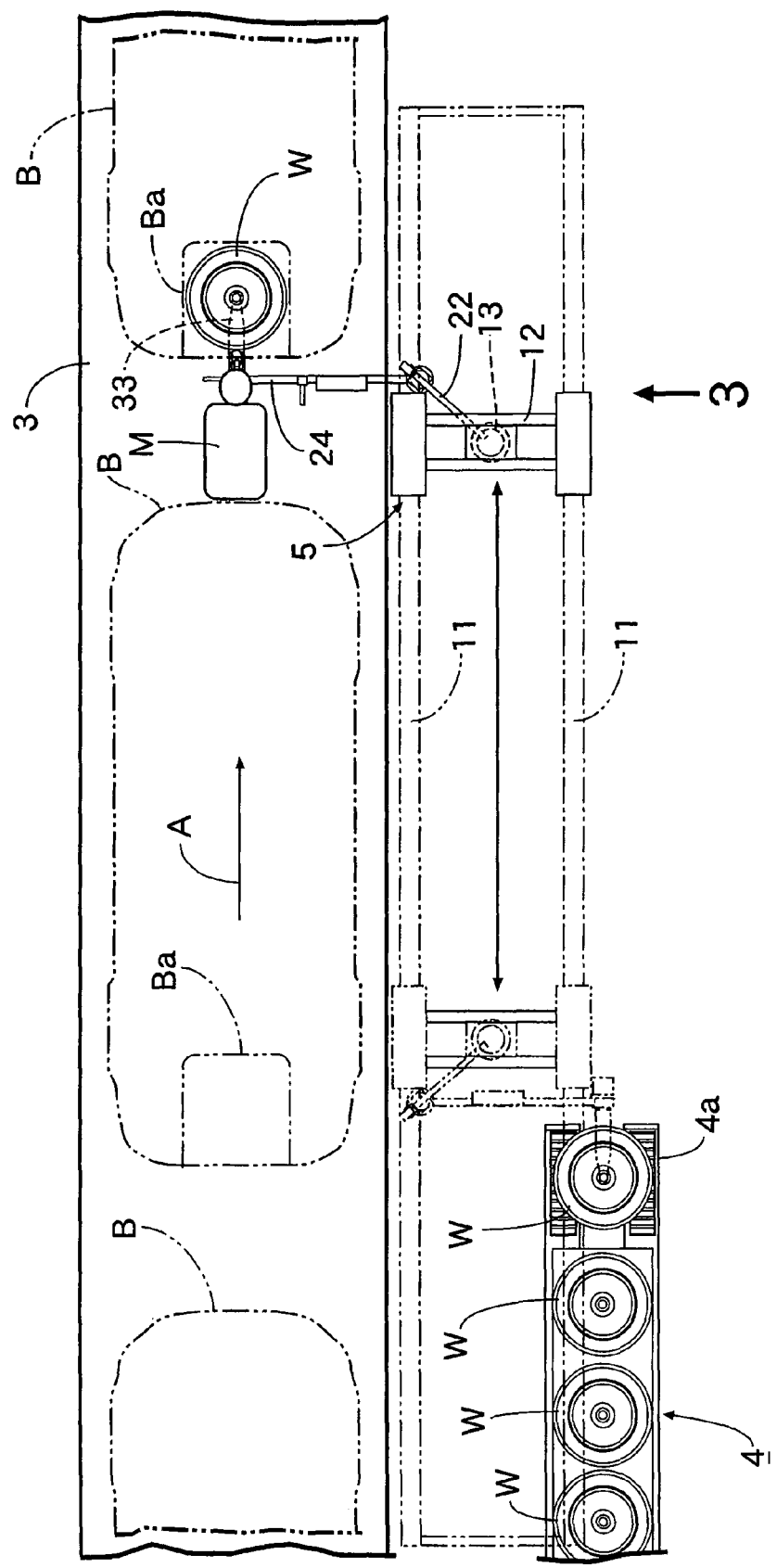
FIG. 2 is a similar plan in which the workpiece transfer system is in a different state (first embodiment).
Figure 3:
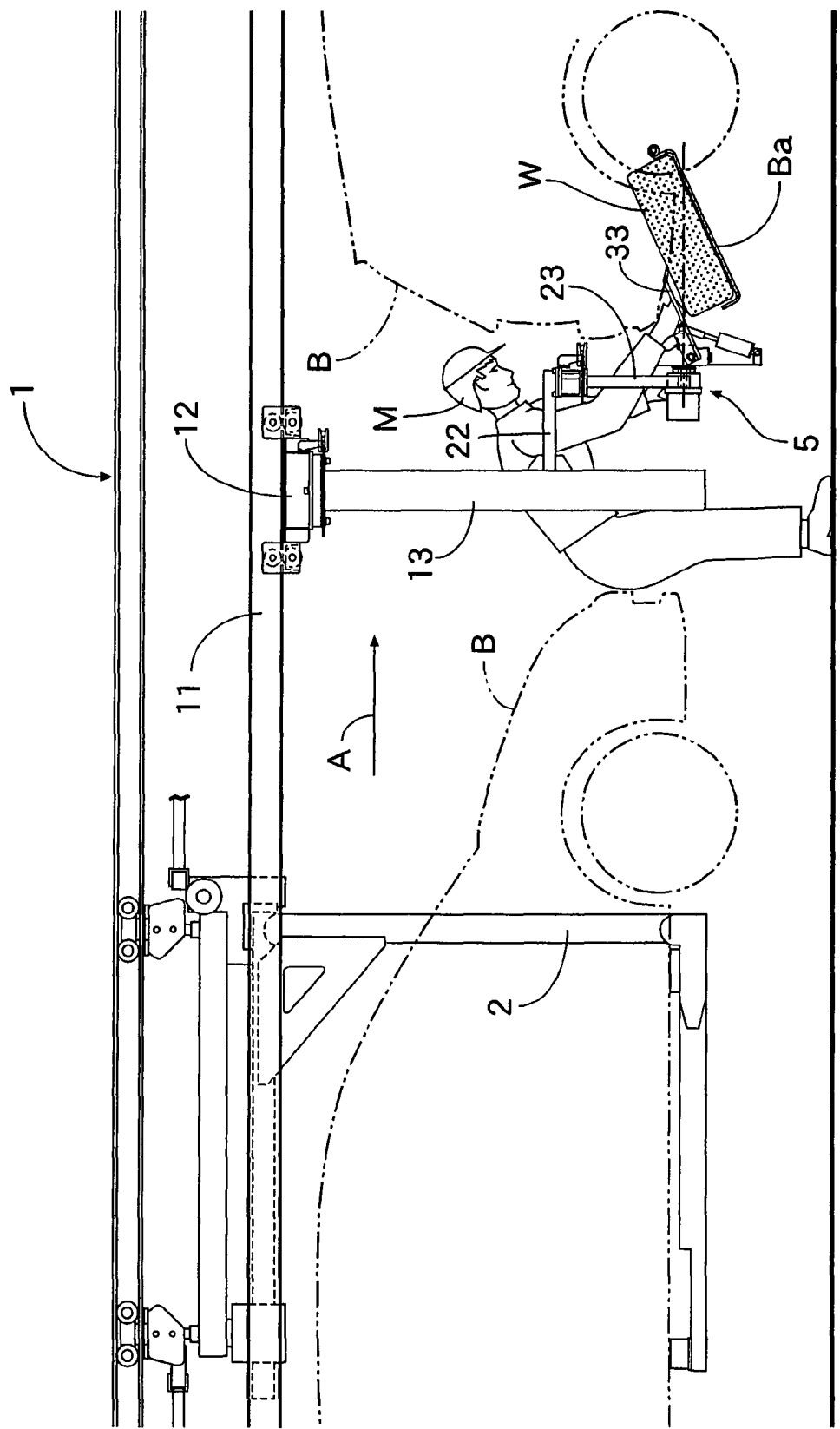
FIG. 3 is a view from arrow 3 in FIG. 2 (first embodiment).

First, as shown in FIG. 1 to FIG. 3, an assembly line for a motor vehicle is provided with an overhead conveyor 1 for supporting a large number of vehicle bodies B by means of a large number of hangers 2 and transporting them in a fixed direction A, a moving floor 3 traveling in synchronism with movement of the hangers 2, a spare wheel supply conveyor 4 installed on a floor on one side of the moving floor 3, and a workpiece transfer system 5 of the present invention for transferring a spare wheel W that has arrived at a discharge section 4a of the spare wheel supply conveyor 4 to a spare wheel retaining dish Ba in a lower part of each of the vehicle bodies B that are being transported.

The spare wheel supply conveyor 4 transports the spare wheel W toward the discharge section 4a, the spare wheel W being in a horizontal state with its outer side upward, and the discharge section 4a is provided with a stopper wall 6 for stopping movement of the spare wheel W and a cutout 7 that enables a first arm 22 of the workpiece transfer system 5, which will be described later, to scoop up the spare wheel W that has arrived at the discharge section 4a. In the spare wheel supply conveyor 4, transporting the spare wheel W in a state in which its outer side faces upward is carried out in order to prevent the outer side of a wheel body part of the spare wheel W from being damaged by sliding contact with the conveyor 4.

The workpiece transfer system 5 is now explained.

As shown in FIG. 1 and FIG. 4 to FIG. 6, in a spare wheel transfer station 10, a pair of guide rails 11 and 11 are provided so as to hang across the transfer station 10 on one side of the overhead conveyor 1 and parallel thereto, and a hollow support post 13 extending vertically downward is rotatably mounted via a bearing 14 on a carriage 12 moving on these guide rails 11 and 11. A first brake 15 is provided between the support post 13 and the carriage 12, the first brake 15 being capable of restricting rotation of the support post 13. This first brake 15 is formed from an electromagnetic caliper 16 mounted on the carriage 12, and a brake disk 17 fixed to an upper end part of the support post 13 and braked by operation of the caliper 16.

Figure 4:
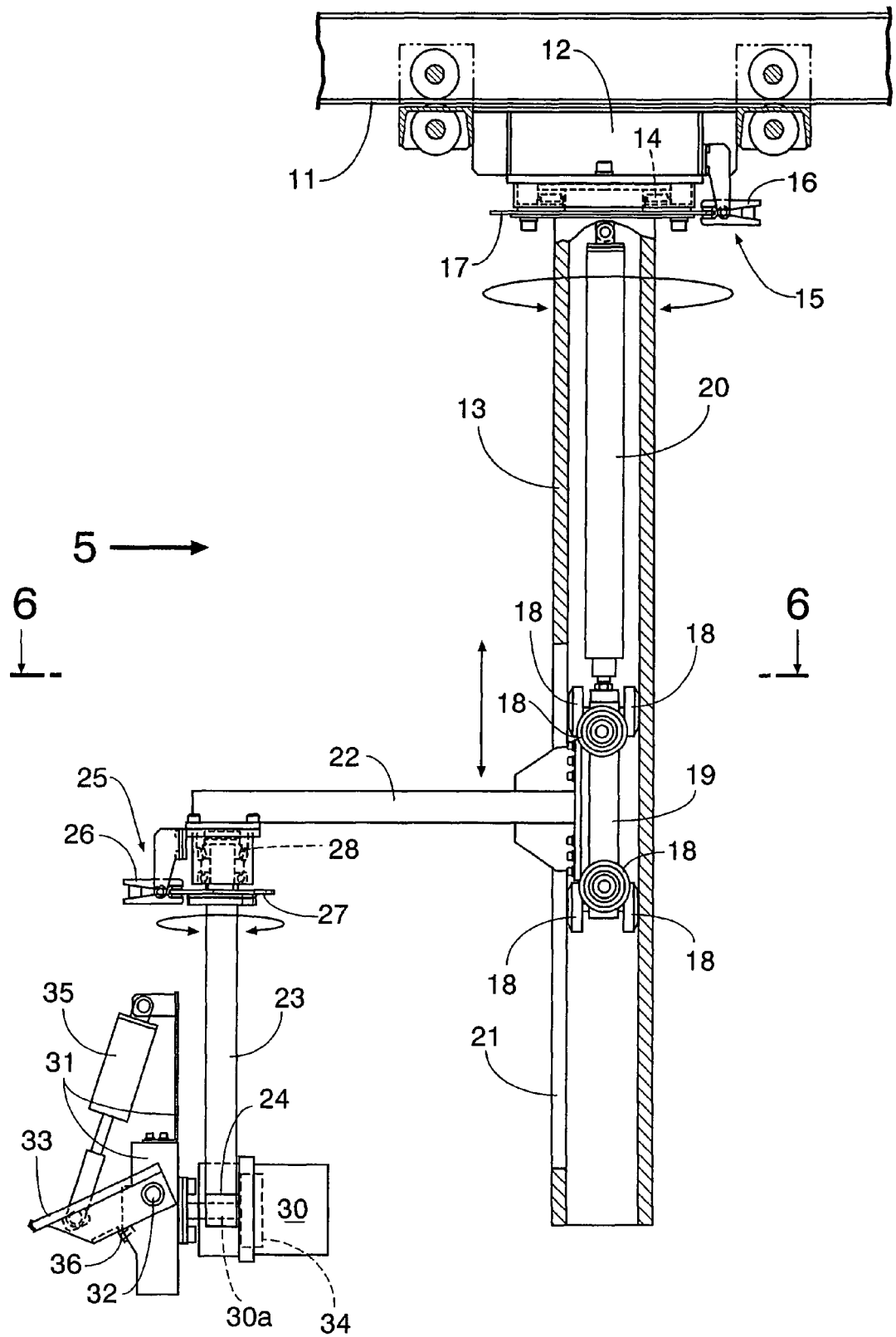
FIG. 4 is an enlarged sectional view along line 4-4 in FIG. 1 (first embodiment).
Figure 5:
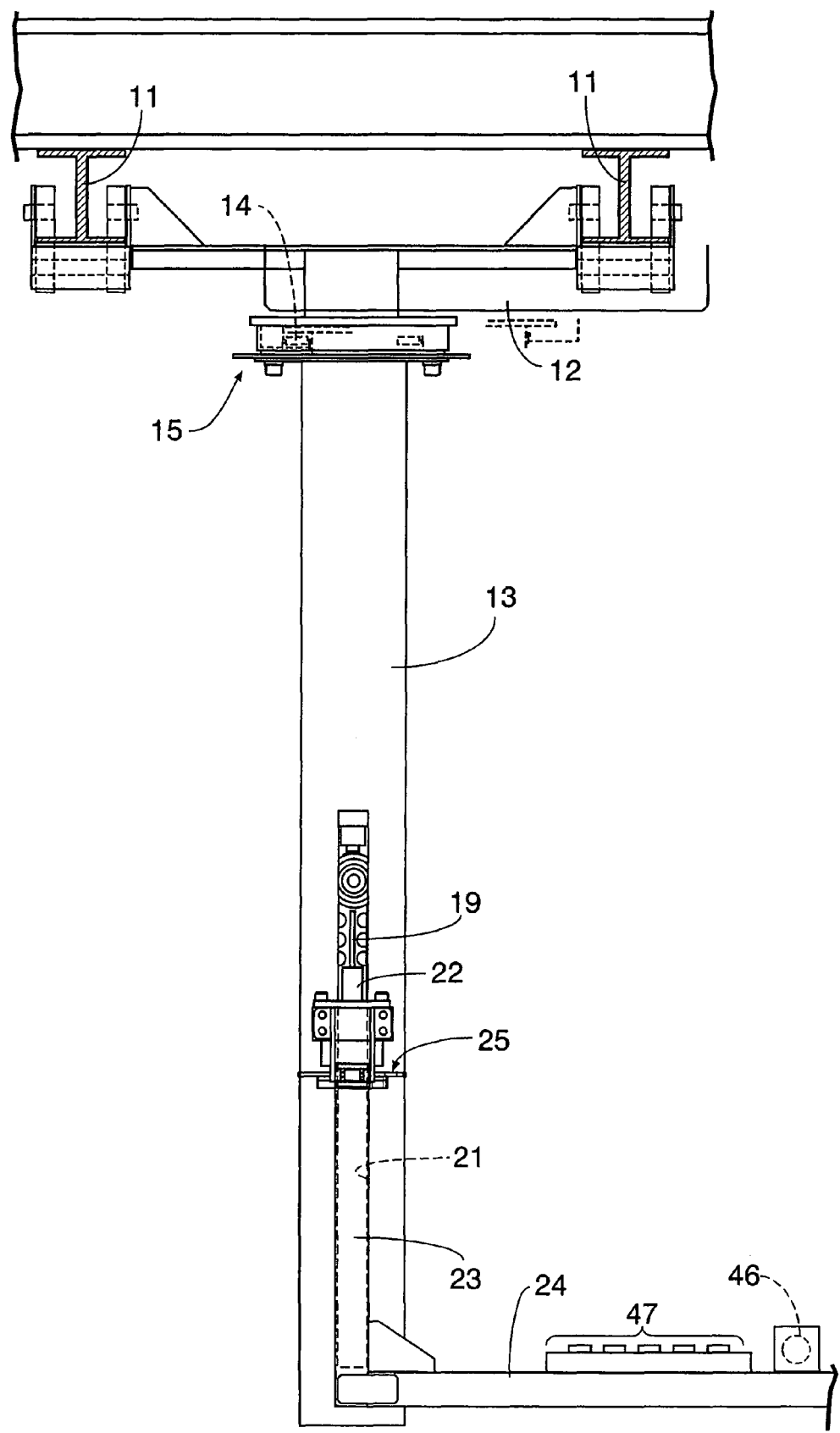
FIG. 5 is a view from arrow 5 in FIG. 4 (first embodiment).

As shown in FIG. 4 to FIG. 5, a raise/lower body 19 is housed in a hollow part of the support post 13, the raise/lower body 19 including a large number of guide wheels 18 that can roll vertically on the inner peripheral face of the hollow part, a first air cylinder 20 is mounted between the raise/lower body 19 and an upper end part of the support post 13, and the raise/lower body 19 can be raised/lowered by expansion and contraction of the first air cylinder 20.

A guide slit 21 is provided in one side wall of the support post 13, the guide slit 21 extending in a longitudinal direction of the support post 13, and a first arm 22 is integrally connected to the raise/lower body 19 through the guide slit 21.

The first arm 22 is disposed horizontally, and an upper end part of a support shaft 23 is rotatably connected to the tip end part of the first arm 22 via a bearing 28, the support shaft 23 being parallel to the support post 13. A second arm 24 is integrally formed with the support shaft 23, the second arm 24 extending horizontally from a lower end part of the support shaft 23 and being capable of pivoting together with the support shaft 23 relative to the first arm 22.

A second brake 25 is provided between the first arm 22 and the support shaft 23, the second brake 25 being capable of restricting relative pivoting between the first and second arms 22 and 24. This second brake 25 is formed from an electromagnetic caliper 26 mounted on the first arm 22, and a brake disk 27 fixed to an upper end part of the support shaft 23 and braked by operation of the caliper 26.

Figure 6:
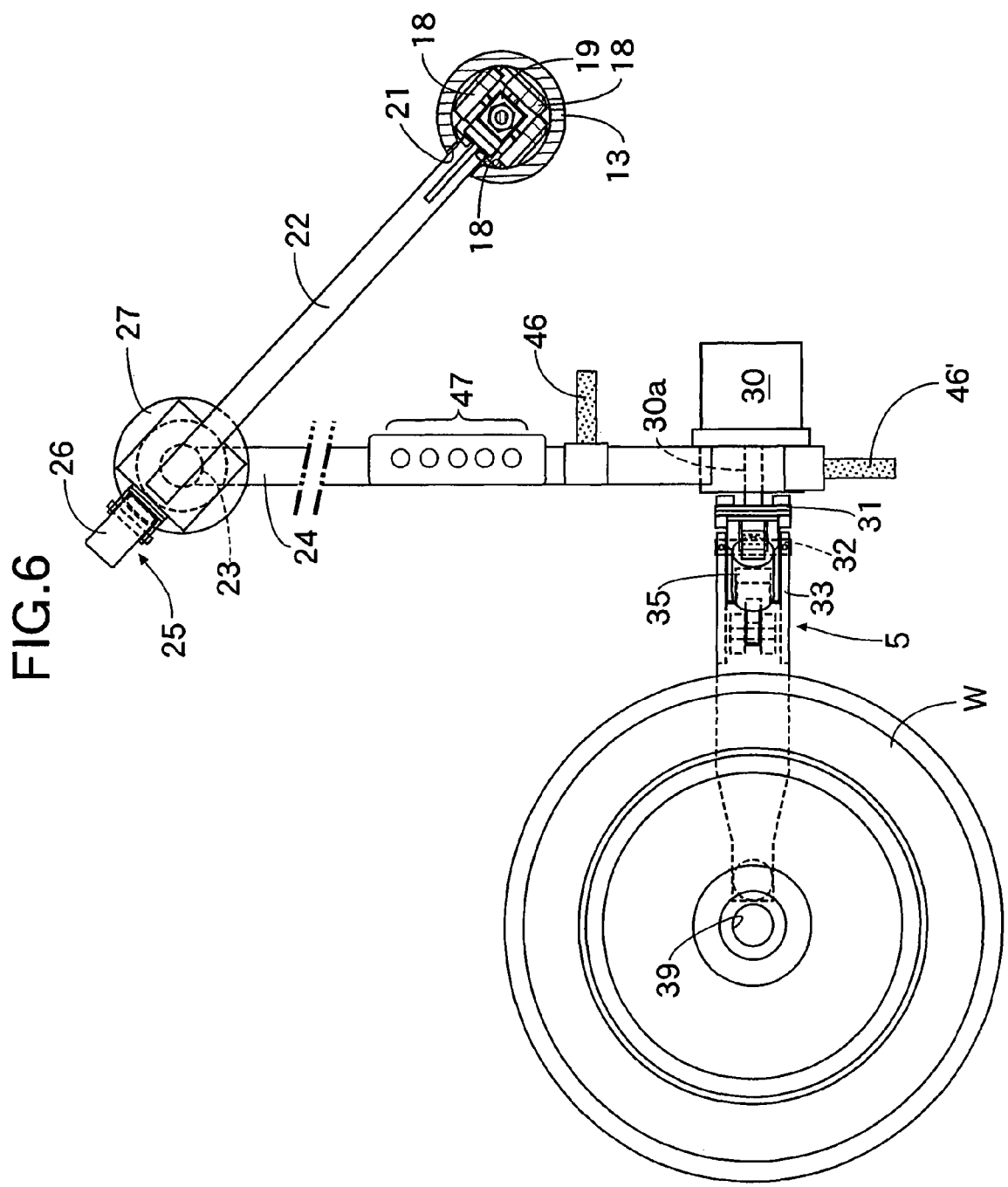
FIG. 6 is a sectional view along line 6-6 in FIG. 4 (first embodiment).
Figure 7:
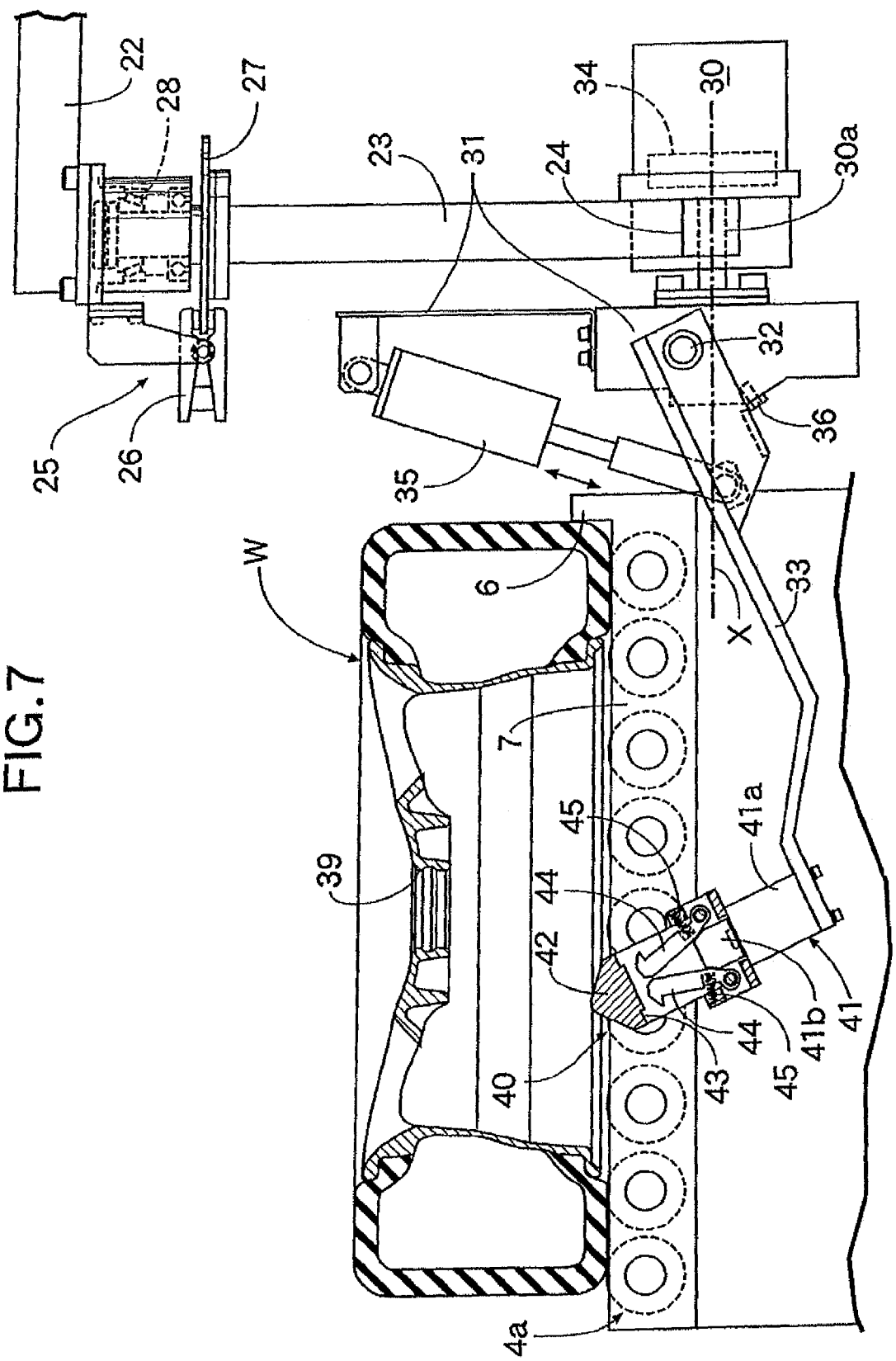
FIG. 7 is an enlarged sectional view along line 7-7 in FIG. 1 showing a state just before a workpiece is retained (first embodiment).

As shown in FIG. 6 and FIG. 7, a stator of an electric motor 30 is secured to a tip end part of the second arm 24. This electric motor 30 is disposed horizontally so that its output shaft 30a forms a right angle with respect to the second arm 24, and a bracket 31 is integrally connected to the output shaft 30a.

A third arm 33 is vertically swingably mounted on the bracket 31 via a horizontal pivot shaft 32, which forms a right angle with respect to the output shaft 30a. The electric motor 30 can therefore be operated so as to freely rotate the bracket 31 via the output shaft 30a. This electric motor 30 includes a third brake 34 for automatically preventing rotation of the output shaft 30a when the electric motor 30 is not operating.

A second air cylinder 35 is mounted between the third arm 33 and the bracket 31; when this second air cylinder 35 contracts (see FIG. 9) the third arm 33 is retained in a substantially horizontal state, when it expands (see FIG. 10) the second arm 24 is retained in a predetermined inclined state in which it is made to abut against a stopper 36 provided on the bracket 31, and this predetermined inclined state of the second arm 24 is set in advance so that the center of gravity G of the spare wheel W retained on the third arm 33 via a clamp 40, which will be described later, is on an axis X of the output shaft 30a of the electric motor 30, and in this predetermined inclined state of the second arm 24, thus reducing the rotational load on the electric motor 30 can be reduced.

Figure 8:
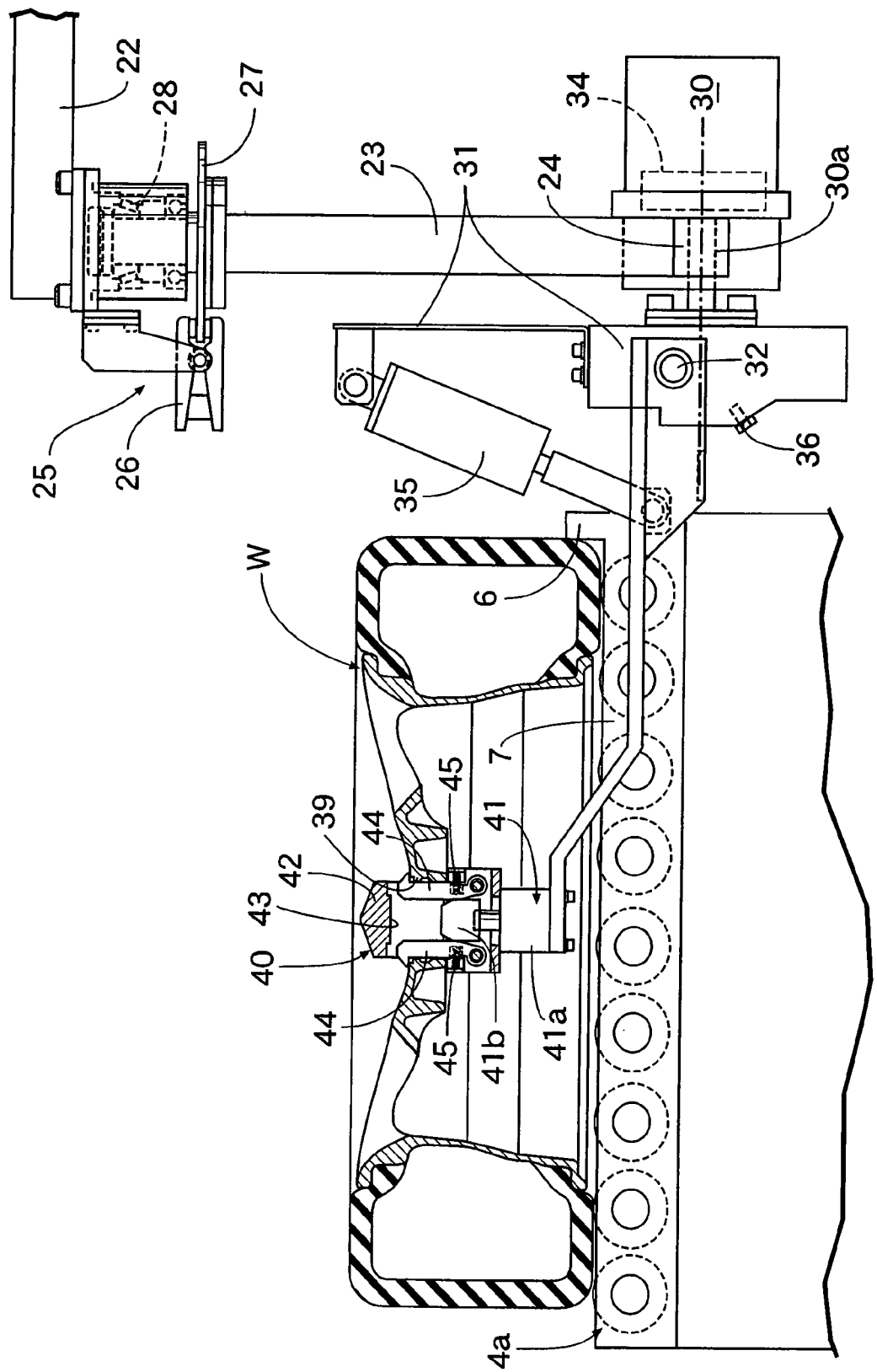
FIG. 8 is a view, corresponding to FIG. 7, showing a state in which the workpiece is retained (first embodiment).

As shown in FIG. 7 and FIG. 8, a clamp 40 is provided on a tip end part of the third arm 33, the clamp 40 detachably engaging with a mounting hole 39 in a central area of the spare wheel W so as to retain the spare wheel W. This clamp 40 is formed from an air clamp cylinder 41 having its cylinder main body 41a secured to an upper face of the tip end part of the third arm 33, a clamp core shaft 42 secured to an upper end face of the cylinder main body 41a and having a conical upper end part, a plurality of clamp claws 44 and 44 axially supported within a slit 43 of the clamp core shaft 42 and having the claw part at the upper end projecting from the slit 43, and a plurality of springs 45 and 45 urging these clamp claws 44 and 44 toward the inside of the slit 43, and an expansion member 41b at the extremity of a piston rod of the air clamp cylinder 41 is disposed opposite inner faces of the clamp claws 44 and 44 so that the expansion member 41b can pivot the clamp claws 44 and 44 in a direction in which they project.

If the air clamp cylinder 41 is operated while the clamp core shaft 42 is fitted into the mounting hole 39 of the spare wheel W, the expansion member 41b projects so as to pivot the clamp claws 44 and 44 outward of the slit 43, and by engaging the claw part with an outer edge part of the mounting hole 39 the clamp 40 is put into a clamping state in which the spare wheel W is retained (the state in FIG. 8). If the air clamp cylinder 41 is made inoperative the clamp claws 44 and 44 are retracted within the slit 43 by the urging force of the springs 45 and 45, thus putting the clamp 40 into an unclamping state in which the spare wheel W is released (the state in FIG. 7).

Referring again to FIG. 5, the second arm 24 has attached thereto a pair of left and right grips 46 and 46' spaced in the longitudinal direction thereof and a group of switches 47 adjacent to one of the grips 46. The group of switches 47 includes a switch for operating the first and second air cylinders 20 and 35 so as to make them expand and contract, a switch for operating the electromagnetic calipers 16 and 26 of the first and second brakes 15 and 25, a switch for controlling forward and reverse rotation of the electric motor 30, etc.

In the drawings, the reference symbol M denotes a worker.

The operation of this embodiment is now explained.

First, in order to take out the spare wheel W that has arrived at the discharge section 4a of the spare wheel supply conveyor 4, as shown in FIG. 1 and FIG. 7, the worker M holds the grips 46 and 46' so as to close the first and second arms 22 and 24 together and brings the support post 13 close to the discharge section 4a by their own power with the clamp 40 in the lead. In this process, the electric motor 30 is operated so as to rotate the bracket 31 in order to make the clamp 40 face upward and be in an unclamping state. Furthermore, the first air cylinder 20 is expanded so as to lower the third arm 33 down to substantially the same height as the spare wheel supply conveyor 4, and at the same time the second air cylinder 35 is expanded so as to incline the third arm 33 downward. In this case, closing the first and second arms 22 and 24 together enables interference of the first and second arms 22 and 24 with other objects to be avoided even in the spare wheel transfer station 10, which is relatively confined.

After the support post 13 is brought close to the discharge section 4a, the clamp 40 is moved directly below the mounting hole 39 of the spare wheel W on the discharge section 4a through the cutout 7, and following this the second air cylinder 35 is contracted so as to fit the clamp core shaft 42 into the mounting hole 39 while maintaining the third arm 33 horizontal. The clamp 40 is then put into a clamping state so as to retain the spare wheel W.

When the spare wheel W is retained by the clamp 40, by slightly contracting the first or second air cylinder 35 the spare wheel W is scooped up from the discharge section 4a.

Figure 9:
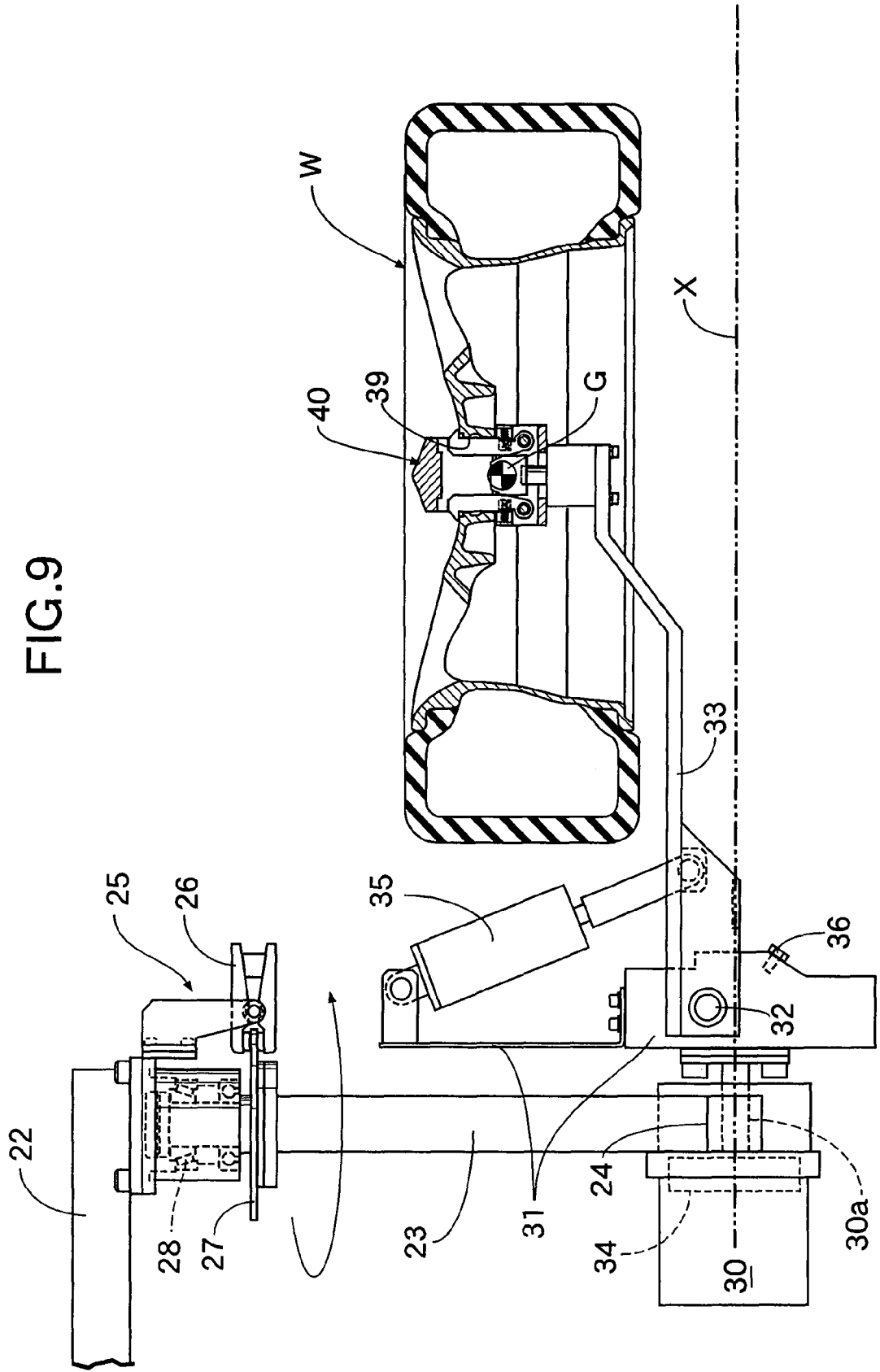
FIG. 9 is a view, corresponding to FIG. 7, showing a state in which the retained workpiece has been moved rotationally (first embodiment).
Figure 10:
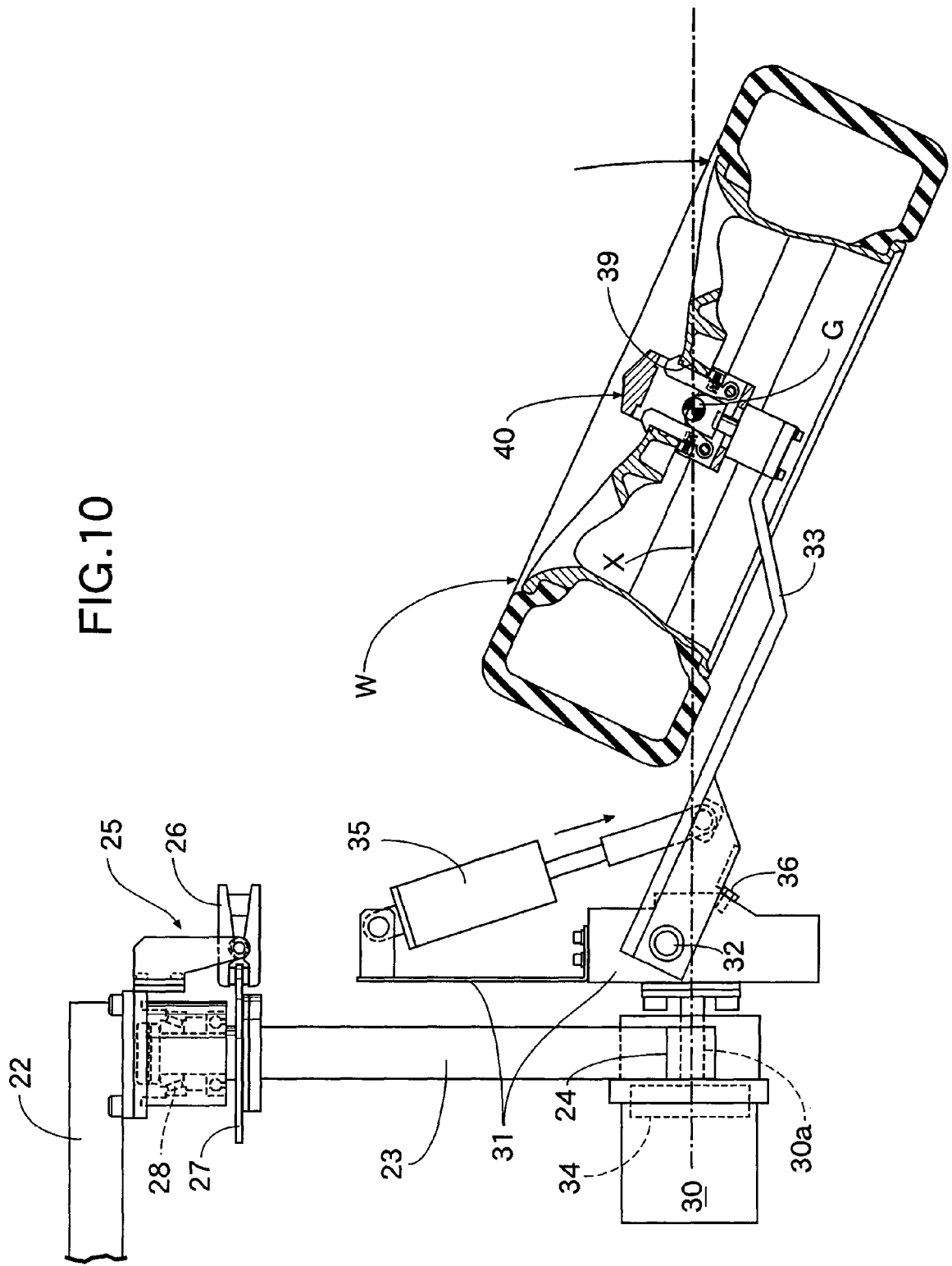
FIG. 10 is a view, corresponding to FIG. 7, showing a state in which the workpiece has been given an inclined attitude (first embodiment).
Figure 11:
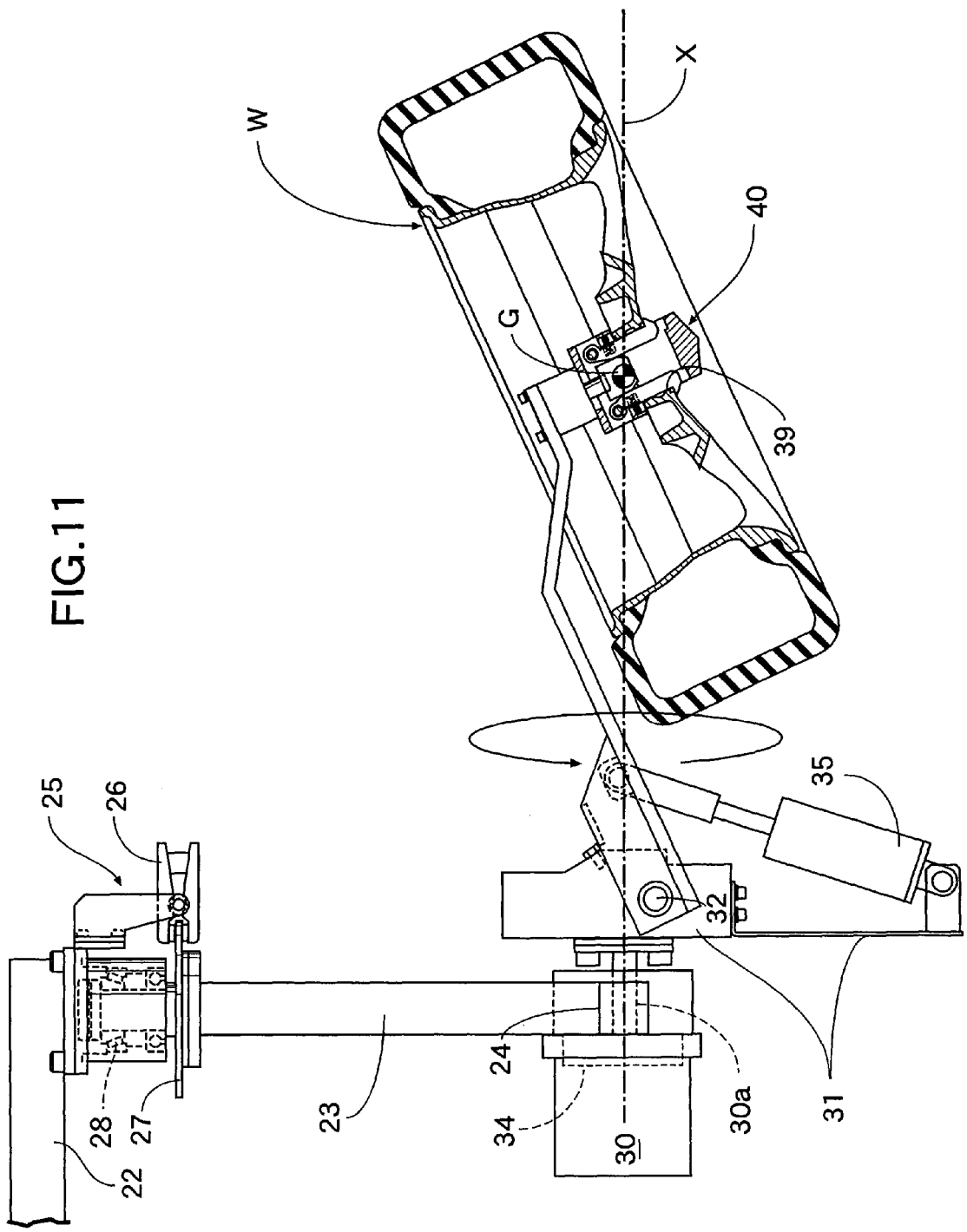
FIG. 11 is a view, corresponding to FIG. 7, showing a state in which the workpiece in an inclined attitude has been turned upside down (first embodiment).

Subsequently, the worker M rotates by their own power the group of arms 22, 24, and 33 around the support post 13 so as to rotationally move the spare wheel W toward the side opposite to the spare wheel supply conveyor 4 as shown in FIG. 9, and following this as shown in FIG. 10 the second air cylinder 35 is expanded so as to incline the spare wheel W together with the third arm 33 down to the front at a predetermined angle. This inclination angle is restricted so as to be always constant by the third arm 33 abutting against the stopper 36 of the bracket 31. Due to this inclination at a constant angle, the center of gravity G of the spare wheel W retained by the clamp 40 comes on the axis X of the output shaft 30a of the electric motor 30 or the vicinity thereof as described above, thus reducing the rotational load on the electric motor 30, and it is therefore possible to turn the spare wheel W upside down with little effort by operating the electric motor 30 as shown in FIG. 11 so as to rotate the bracket 31 through 180° by means of the output shaft 30a. This allows the electric motor 30 to be of a small type with a relatively small output, thus enabling the workpiece transfer system 5 to be reduced in weight and reducing the production cost. Moreover, since the electric motor 30 includes the third brake 34, which automatically prevents rotation of the output shaft 30a when the electric motor 30 is not operating, after the spare wheel W is inverted, its attitude can automatically be fixed.

The spare wheel W inverted as shown in FIG. 11 is given an inclined attitude that is opposite to the previous attitude, that is, it is inclined up to the front, and this inclined attitude corresponds to a receiving attitude in which the rear end of a spare wheel retaining dish Ba prepared in a rear part of each of the vehicle bodies B that are being transported is open.

As shown in FIG. 2, and FIG. 3, the worker M opens apart the first and second arms 22 and 24 and steps on the moving floor 3 in order to transfer the spare wheel W directly behind the spare wheel retaining dish Ba, and after the spare wheel W is transferred directly above the spare wheel retaining dish Ba, the spare wheel W is detached from the clamp 40 by putting the clamp 40 into the unclamping state.

The spare wheel W is thus transferred to the spare wheel retaining dish Ba of the vehicle body B that is being transported; during this transfer operation the vehicle body B continues to be transported by the overhead conveyor 1, and accompanying this transport the support post 13 is pulled from the worker M side on the moving floor 3 and moves on the rails 11 and 11, thus avoiding obstructing the transfer operation.

During the above-mentioned operation, the worker M operates the first and second brakes 15 and 25 as necessary, thus being able to freely prevent relative pivoting between the support post 13, the first arm 22, and the second arm 24. For example, when the spare wheel W is moved directly behind the spare wheel retaining dish Ba on the moving floor 3, if relative pivoting between the three, that is, the support post 13, the first arm 22, and the second arm 24, is prevented by operating the two brakes 15 and 25, there is no lateral movement of the spare wheel W, and the spare wheel W can easily be moved directly above the spare wheel retaining dish Ba.

By repeating the same procedure thereafter, spare wheels W on the spare wheel supply conveyor 4 can be transferred to the spare wheel retaining dish Ba of the vehicle bodies B that are transported in sequence.

In this way, a single worker carries out as appropriate horizontal movement of the support post 13, raising/lowering of the first arm 22, rotation of the first arm 22 around the axis of the support post 13, relative pivoting of the first and second arms 22 and 24, rotation of the bracket 31, and swinging of the third arm 33, and as a result the spare wheel W retained by the clamp 40 can easily be transferred with little effort to the spare wheel retaining dish Ba of the vehicle body B during transport even in a confined place while giving the spare wheel W various attitudes such as inclining it and turning it upside down, thereby greatly reducing the load on the worker M.

The present invention is not limited to the above-mentioned embodiment and may be modified in a variety of ways as long as the modifications do not depart from the spirit and scope thereof. For example, the present invention is not limited only to transfer of the spare wheel W, but may also be applied to the transfer of various types of workpiece. Furthermore, instead of the electric motor 30, a manual handle may be connected to the output shaft 30a, and the workpiece W may be inverted by rotating the manual handle.

The invention claimed is:

1. A workpiece transfer system comprising a bracket rotatably supported on a support part, a rotary drive device provided on the support part in order to rotate the bracket, a workpiece support arm vertically, swingably and axially supported on the bracket, a swing drive device provided on the bracket in order to swing the workpiece support arm, a workpiece retaining device provided on a tip end part of the workpiece support arm and-configured to retain a workpiece that is to be transferred, and a restricting device for restricting an angle of the workpiece support arm, which is swung vertically by operation of the swing drive device at a predetermined fixed angle so that when the workpiece is retained by the workpiece retaining device a center of gravity of the workpiece will be located on an axis of rotation of the rotary drive device or in the vicinity thereof , and operation of the rotary drive device enabling the bracket to be rotated while the workpiece support arm is set at the predetermined swing angle by the restricting device.

2. The workpiece transfer system according to claim 1, wherein
the support part comprises a rotatably mounted support post, a horizontally extending first arm linearly supported on the support post so as to be lifted and lowered and rotated with the support post around an axis of the support post, and a horizontally extending second arm pivotably connected to a tip end part of the first arm.

3. The workpiece transfer system according to claim 2, wherein
the system comprises a first brake which when actuated prevents rotation of the first arm around the axis of the support post, a second brake which when actuated prevents relative pivoting of the first and second arms, and a third brake which when actuated prevents rotation of the bracket.

4. The workpiece transfer system according to claim 3, wherein the third brake is incorporated into the rotary drive device.

5. The workpiece transfer system according to any one of claims 2 to 4, wherein the system comprises a guide device for horizontally movably supporting the support post.

6. A workpiece transfer method comprising a first step of retaining, by a tip end part of a workpiece support arm axially supported on a bracket supported on a support part rotatably around a horizontal axis, a workpiece that is to be transferred, while swinging the workpiece support arm vertically, a second step of inverting the workpiece by rotating the workpiece support arm around the horizontal axis after the first step, and a third step of moving the bracket to thus move the workpiece to a predetermined transfer position and releasing retention of the workpiece after the second step, the workpiece support arm being vertically swung to and restricted at a predetermined fixed angle where the center of gravity of the workpiece is located on the horizontal axis or in the vicinity thereof in the first step, and in the third step the workpiece at a predetermined angle after being swung being rotated around the horizontal axis by rotation of the bracket.

7. The workpiece transfer method according to claim 6, wherein
in the second step rotation of the workpiece support arm around the horizontal axis is carried out manually.

8. The workpiece transfer method according to claim 6, wherein
in the second step rotation of the workpiece support arm around the horizontal axis is carried out by operation of an actuator.

9. The workpiece transfer system according to claim 1, wherein the workpiece retaining device is a clamp.

10. The workpiece transfer system according to claim 1, wherein the workpiece support arm is supported on the bracket by a pivot shaft which extends substantially perpendicular to an output shaft of the rotary drive device.

11. The workpiece transfer system according to claim 1, wherein the swing drive device is operatively connected between the bracket and the workpiece support arm.

12. The workpiece transfer system according to claim 11, wherein the swing drive device comprises an extensible cylinder.

13. The workpiece transfer system according to claim 1, further comprising a grip provided on said second arm configured to be manually manipulated by an operator.

14. The workpiece transfer system according to claim 2, wherein the first brake is operatively connected to the support post, the second brake is operatively mounted between the first arm and the second arm, and the third brake is operatively connected to an output shaft of the rotary drive device.

15. The workpiece transfer system according to claim 1, wherein the transfer system is configured to transfer a wheel-mounted spare tire, and the retaining device is configured to retain the spare tire through engagement with a central opening of the wheel.

16. The workpiece transfer system according to claim 1, wherein the restricting device is a stopper projecting from the bracket.

* * * * *